Jan. 26, 1932.  J. FECHTIG  1,842,862
MEASURING COCK
Filed June 12, 1931  2 Sheets-Sheet 1
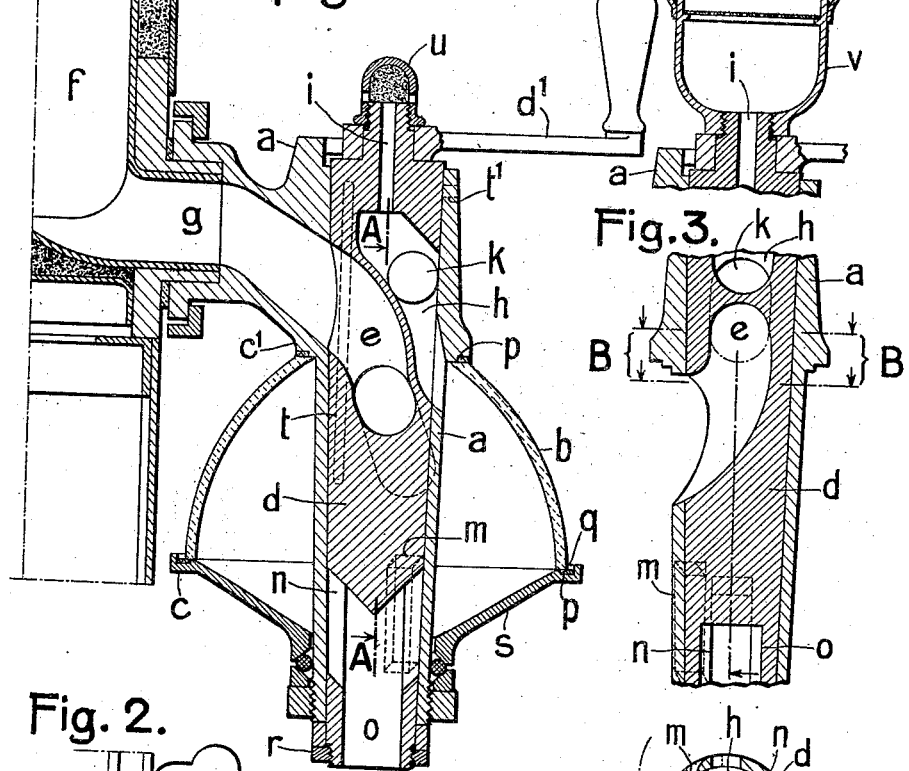
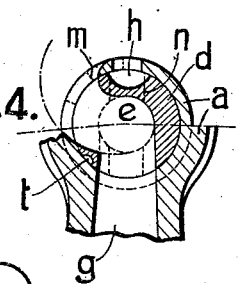
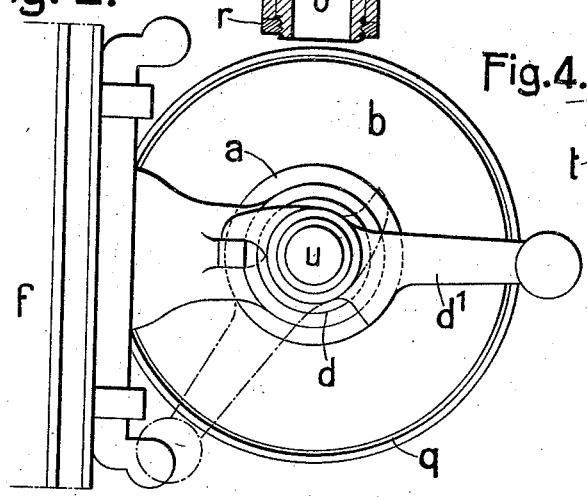
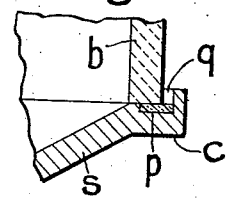
Inventor:
J. Fechtig,
by C. F. Wundorth
Atty Jan. 26, 1932.    J. FECHTIG    1,842,862
MEASURING COCK
Filed June 12, 1931    2 Sheets-Sheet 2

Inventor:
J. Fechtig
by E. F. Wenderoth
Atty

Patented Jan. 26, 1932

1,842,862

UNITED STATES PATENT OFFICE

JOHANN FECHTIG, OF WYHLEN, GERMANY, ASSIGNOR TO THE FIRM OF EISENBAU WYHLEN AKTIENGESELLSCHAFT, OF WYHLEN, GERMANY

MEASURING COCK

Application filed June 12, 1931, Serial No. 544,025, and in Germany June 26, 1930.

The invention relates to a measuring cock for milk and other liquids in which a measuring vessel is arranged coaxially on the cock casing.

The invention is characterized by the filling conduit in the plug for filling the measuring vessel terminating approximately tangentially on the periphery of the cock casing inside the measuring vessel. In consequence the liquid in the measuring vessel is given a swirling motion and the air in the vessel is swept off the inner walls thereof and driven to the air vent. In this way the measuring vessel is rapidly filled to the top and can always be filled to the same amount.

The accompanying drawings illustrate two examples embodying the invention.

Fig. 1 is a vertical section of one embodiment,

Fig. 2 is a plan view of Figure 1.

Figure 3 is a part section on the line A—A of Figure 1.

Figure 4 is a cross section on the line B—B of Figure 3.

Figure 5 is a section of a detail.

Figure 6 shows a detail modification.

Figure 7:
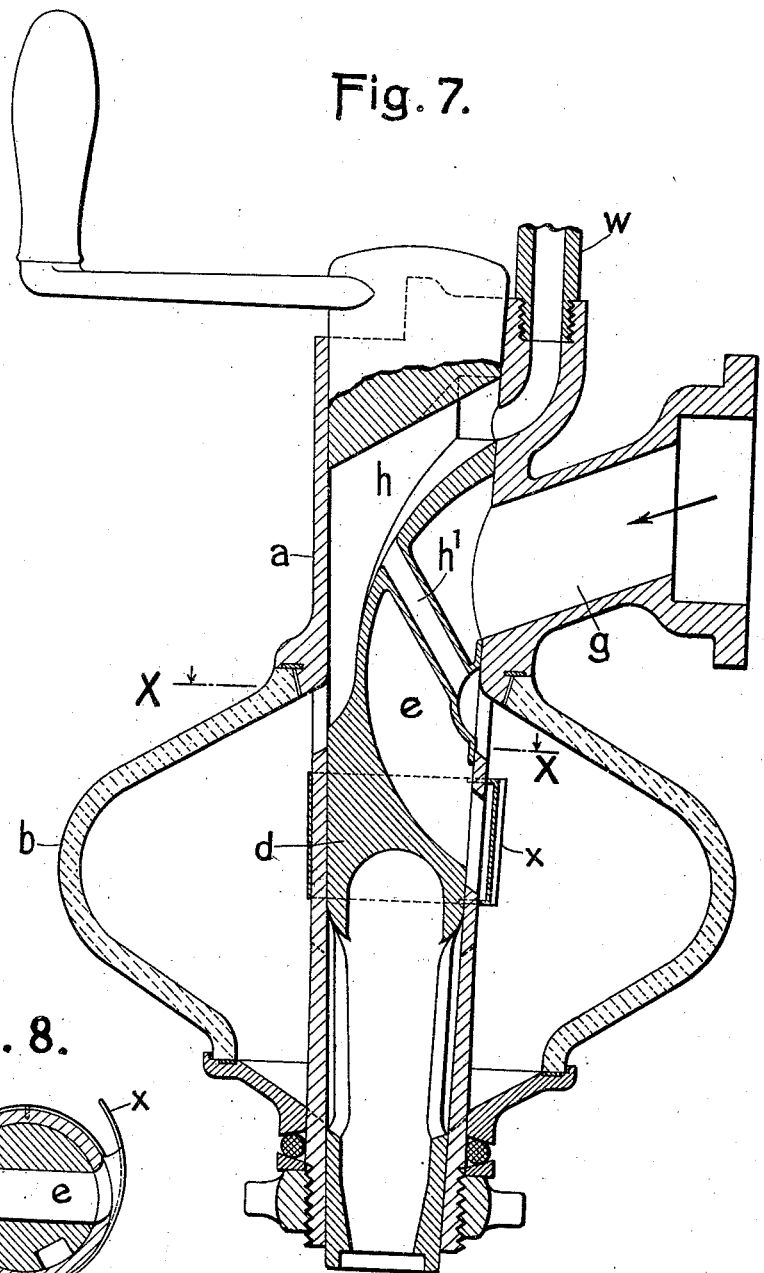
Figure 7 shows the second embodiment.

A dome shaped measuring vessel $b$ of glass is detachably, coaxially secured to the cock casing $a$ (Figure 1) between two holding seats $c$, $c^1$. $d$ is the cock plug with the large bore filling conduit $e$ which opens tangentially on the plug periphery into the vessel $b$ (Figure 4) and in the open position is in communication with the liquid feed conduit $g$ coming from the storage container $f$. In this position the liquid flows in a compact stream into the vessel $b$ with a swirling motion which drives the air before it, sweeping the whole of the vessel so that the air is positively driven towards the air vent conduit $h$ in the upper part of the plug. Owing to the dome shape of the vessel $b$ of the air is gathered together towards the upper part of the plug and the conduit $h$, which also aids in satisfactory venting of the vessel. The air escapes from the conduit $h$ through the central conduit $i$ while the vessel $b$ fills, until a floating ball valve $k$ in the plug, raised by the ascending liquid, finally closes the conduit $i$.

The measured liquid can then be discharged from the vessel $b$ by turning the plug $d$ which for this purpose is furnished with a handle $d^1$, the liquid flowing out of the vessel through the lower lateral openings $m$, $n$ and the axial plug bore $o$, while air can enter the vessel $b$ through the longitudinal groove $t$ in the cock and the lateral air hole $t^1$ in the cock casing.

The vessel $b$ makes joint with the holding seats $c$, $c^1$ by the aid of rubber rings $p$. As shown in Figure 5 these lie in grooves $q$ in the seats and can only be compressed until the edges of the vessel $b$ bear hard against the edges of the grooves in the seats $c$, $c^1$. In this way it is ensured that when the apparatus is put together the measuring space inside the vessel $b$ is always the same, which with small measurements when a noticeable variation would occur with varying compression of the packing, is of particular importance. Moreover by this means the liquid does not come into contact with the rubber rings.

To take the apparatus to pieces it suffices after unscrewing the nut $r$, to pull the plug out of the casing, the float valve $k$ accompanying it, and the bottom $s$ of the vessel $b$ can be slid downwardly off the casing together with the vessel itself. Putting together of the parts is equally easy, the compression of the packing rings $p$ always being limited to the same amount by the hard contact of the edges of the vessel against the margins of the packing grooves in the seats $c$, $c^1$.

In Figure 1 the air vent conduit $i$ is covered by a dome $u$ furnished with a plug of wadding or the like. In the modification shown in Figure 6 a beaker $v$ furnished with a strainer is employed in its place.

In the above described embodiment the air can be driven off rapidly, but with only one vent conduit cannot escape sufficiently rapidly because the air is dammed up on the side of the plug opposite the vent opening and cannot pass sufficiently rapidly round the plug to the opening. This is particularly the case with cold milk, where frothing is unavoidable and the air containing bubbles do not easily move round the cock to the opening owing to the viscosity of the liquid.

Figure 8:
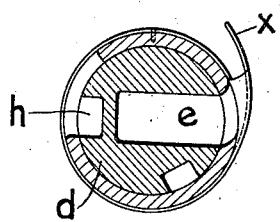
Figure 8 is a part section on the line X—X of Figure 7.

This disadvantage is overcome in the embodiment shown in Figures 7 and 8 by the cock being provided not with one, but with two air vent passages distributed round its periphery so that the air has greater opportunities for rapid escape.

In this embodiment, $a$ is again the cock casing, $b$ the transparent measuring vessel coaxial therewith and $d$ the cock plug with the filling conduit $e$ and the air vent conduit $h$ similarly to the first embodiment, the filling conduit $e$ again terminating tangentially at the periphery of the cock casing, inside the measuring vessel (see Figure 8). $g$ is the liquid supply conduit.

In addition to the air vent conduit $h$ which here leads to a rising pipe $w$ in place of a float valve, the plug $d$ is provided with a second air vent conduit $h^1$ opening in its periphery at a point diametrically opposite the first, which joins the upper broader part of the conduit $h$ so that at any rate the air otherwise dammed at the point opposite the first opening and unable to pass sufficiently rapidly around the plug to the conduit $h$ can now rapidly escape. Naturally more than two air vent passages can be distributed round the periphery of the casing.

To reinforce the swirling of the liquid, here a bush is placed on the cock casing inside the vessel $b$, which at the mouth of the filling conduit $e$ has a curved guide vane $x$ which ensures the tangential outflow of the liquid.

What I claim is:—

1. A measuring cock having a casing and a plug, a measuring vessel coaxial with the cock casing, a filling conduit in the cock plug for filling said vessel, this filling conduit having a tangential outlet at the periphery of the cock casing inside the measuring vessel.

2. A measuring cock having a casing and a plug, a measuring vessel coaxial with the cock casing, a filling conduit in the cock plug for filling said vessel, this filling conduit having a tangential outlet at the periphery of the cock casing, inside the measuring vessel, two holding seats between which the vessel is removably secured, grooves in said seats and packing rings located therein, the whole being so arranged that the rings can only be compressed always to the same amount, until the edges of the vessel bear hard against the margins of the grooves in the holding seats.

3. A measuring cock having a casing and a plug, a measuring vessel coaxial with the cock casing and of dome form with its smaller end uppermost, a filling conduit in the cock plug for filling said vessel, this filling conduit having a tangential outlet at the periphery of the cock casing, inside the measuring vessel.

4. A measuring cock having a casing and a plug, a measuring vessel coaxial with the cock casing, a filling conduit in the cock plug for filling said vessel, this filling conduit having a tangential outlet at the periphery of the cock casing, inside the measuring vessel, a plurality of air vent conduits being provided in the plug with their openings distributed round its periphery.

5. A measuring cock having a casing and a plug, a measuring vessel coaxial with the cock casing, a filling conduit in the cock plug for filling said vessel, this filling conduit having a tangential outlet at the periphery of the cock casing, inside the measuring vessel, a guide vane being provided at the outlet of said conduit so as to ensure tangential outflow of the liquid therefrom.

In witness whereof I have hereunto signed my name this 3rd day of June, 1931.

JOHANN FECHTIG.